US007099818B1

(12) United States Patent
Nemecek et al.

(10) Patent No.: US 7,099,818 B1
(45) Date of Patent: Aug. 29, 2006

(54) SYSTEM AND METHOD FOR AUTOMATICALLY MATCHING COMPONENTS IN A DEBUGGING SYSTEM

(75) Inventors: Craig Nemecek, Seattle, WA (US); Steve Roe, Woodinville, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 717 days.

(21) Appl. No.: 10/113,065

(22) Filed: Mar. 29, 2002

(51) Int. Cl.
*G06F 9/455* (2006.01)
*G06F 11/00* (2006.01)
*G06F 9/44* (2006.01)

(52) U.S. Cl. .................... 703/28; 714/28; 717/124; 717/134

(58) Field of Classification Search ............. 717/124, 717/127–129, 134; 703/28; 702/123; 714/28
See application file for complete search history.

(56) References Cited

U.S. PATENT DOCUMENTS

| 4,964,074 | A | * | 10/1990 | Suzuki et al. .................. 703/28 |
| 5,339,262 | A | * | 8/1994 | Rostoker et al. ................ 716/4 |
| 5,455,927 | A | * | 10/1995 | Huang ......................... 710/305 |
| 5,495,594 | A | * | 2/1996 | MacKenna et al. ............ 710/11 |
| 5,594,890 | A | * | 1/1997 | Yamaura et al. ............... 703/23 |
| 5,675,825 | A | * | 10/1997 | Dreyer et al. .................. 712/42 |
| 5,933,816 | A | * | 8/1999 | Zeanah et al. ................. 705/35 |
| 5,978,584 | A | * | 11/1999 | Nishibata et al. ............ 717/134 |
| 6,075,941 | A | * | 6/2000 | Itoh et al. ..................... 717/128 |
| 6,202,044 | B1 | * | 3/2001 | Tzori ............................ 703/28 |
| 6,223,147 | B1 | * | 4/2001 | Bowers ........................ 703/25 |
| 6,345,383 | B1 | * | 2/2002 | Ueki ............................ 717/124 |
| 6,408,432 | B1 | * | 6/2002 | Herrmann et al. ........... 717/139 |
| 6,411,974 | B1 | * | 6/2002 | Graham et al. .............. 715/531 |
| 6,449,755 | B1 | * | 9/2002 | Beausang et al. ............... 716/5 |
| 6,453,461 | B1 | * | 9/2002 | Chaiken ...................... 717/124 |
| 6,460,172 | B1 | | 10/2002 | Insenser Farre et al. ...... 716/17 |
| 6,769,622 | B1 | * | 8/2004 | Tournemille et al. ....... 235/492 |
| 6,865,504 | B1 | * | 3/2005 | Larson et al. ............... 702/123 |

OTHER PUBLICATIONS

"MPLAB—IDE, Simulator, Editor—User's Guide", 2000, Microchip Technology Incorporated, Product Manual.*
"ICEPIC In-Circuit Emulator—User'Guide", 2000, Microchip Technology Incorporated, Product Manual.*
Winters, "Using IEEE-1149.1 for in-circuit emulation", Sep. 1994, Proceedings of WESCON '94, ISBN 0-7803-9992-7, pp. 525-528.*
Huang, Chen, Kao, "Reusable embedded in-circuit emulator", 2001, Proceedings of the ASP-DAC 2001, ISBN 0-7803-633-6, pp. 33-34.*
Staffan Nilsson, "In circuit emulators", Mar. 12, 2001, website: <http://www.algonet.se/~staffann/developer/emulator.htm>, archived at <http://web.archive.org/web/20010312175339/http://www.algonet.se/~staffann/developer/emulator.htm>, accessed May 12, 2005.*

* cited by examiner

*Primary Examiner*—Paul L. Rodriguez
*Assistant Examiner*—Dwin M. Craig

(57) ABSTRACT

Communications between a device and a debugging system are effectuated by programming an ICE with a first logic set, which enables the ICE to establish communications with the device and determine a unique identifier thereof. The ICE communicates the device's unique identifier back to a host computer. The host computer matches the unique identifier to a second logic set and a plug-in module. The host computer then programs the ICE with the second logic set and activates the plug-in module. The second logic set allow the ICE and the device to execute program instructions downloaded with the second logic set in lock-step fashion. The plug-in module allows the host computer to interact in the debugging process as necessary. This achieves flexibility, because any ICE may be programmed to communicate with any device.

22 Claims, 5 Drawing Sheets

SYSTEM AND METHOD FOR AUTOMATICALLY MATCHING COMPONENTS IN A DEBUGGING SYSTEM

TECHNICAL FIELD

The present invention relates to the field of software and hardware development. Specifically, embodiments of the present invention relates to development tools, especially useful for debugging microcontroller programs.

BACKGROUND ART

Debugging software (e.g., done with debugger equipment) effectuates correction of problems in software by finding errors in program logic, and in hardware by finding errors in circuitry. Debuggers stop programs at certain breakpoints and display various programming elements regarding the machine's internal state. This allows programmers to step through program source code statements individually and sequentially, while corresponding machine instructions are being executed and observed, and correct and/or modify the code as necessary.

Debuggers may deploy an in-circuit emulator (ICE) to follow certain functions and features of a device, such as a microcontroller or other integrated circuit (IC). The ICE thus allows debugger software to place code within a device under test, set breakpoints and other debugging functions therein, and prompt the device under test to implement supervisory and other debugging operations. These ICE functions further allow the debugger software to "look into" memory, registers, and other internal resources of the device under test to observe the effects corresponding to the execution of the program code.

An IC device, such as a microcontroller, may be deployed upon a pod for testing. The pod electrically interconnects the microcontroller or other IC to be tested with the ICE. There are many varieties of microcontrollers and other IC's in existence and under development. Information may change with each different device. Such information may include the way in which decoding of supervisory operational codes are performed. The types of information that might change with each different device may also include the reset sequence of the device. Further, the types of information that might change with each different device may include the way in which the device is programmed.

As a result, separate ICE's are typically required for each different microcontroller or other IC that needs to be tested and debugged. Further, if the same microcontroller or other IC to which a particular ICE corresponds is deployed upon a different pod, yet another separate ICE may be required. In general, a particular emulator is limited to operating with a single type of microcontroller or other IC.

A user of a conventional debugging system, may thus be forced to access and maintain a variety of different ICE's for each and every microcontroller or other IC they test. Also, each time a user of a conventional debugging system changes the microcontrollers or other ICs to be tested, they must acquire the corresponding ICE. Further, a user of a conventional debugging system who is developing new microcontrollers or other ICs must develop corresponding ICEs to test them. A user may thus find a conventional debugging system problematic for a number of reasons.

For instance, a conventional debugging system may require access to a variety of different ICEs for each and every microcontroller or other IC they must test. This may limit the flexibility of the conventional debugging system, especially when microcontrollers or other ICs in use change. Also, ICEs are not inexpensive, and upon acquisition, they must be properly selected, stored and maintained. This adds expense to the cost of a debugging system.

As new microcontrollers or other ICs are developed, a unique, corresponding ICE must be also be individually developed to some degree. This adds complexity to the development of the associated microcontroller or other IC. It also affects the cost of development of that device. This is because the cost of developing the associated ICE must be factored in with that of the development of the microcontroller or other IC, adding to their expense, also.

Each version must also be correctly matched to a particular pod and/or microcontroller or other IC. This adds complexity to the debugging or other test process in general, and to the component matching process in particular. These problems render debugging in a distributed hardware environment by conventional means expensive, time consuming, resource intensive, and laborious.

SUMMARY OF THE INVENTION

What is needed is a system and/or method for debugging that allows a single in-circuit emulator (ICE) to be used across many different devices to be tested. What is also needed is a system and/or method for debugging that does not require developing, obtaining, and/or maintaining a variety of ICEs to be used in testing different and/or newly developed devices. Further, what is needed is a system and/or method for debugging wherein flexibility is achieved by enabling a single ICE to function to communicatively couple any device to be tested with a particular debugging system to which the ICE belongs. Embodiments of the present invention provide the above advantages.

Embodiments of the present invention allow the same ICE base unit and the same software (e.g., a universal developer kit) to be applied with a multiple number of pod combinations with microcontrollers and other IC devices the pods may deploy. When initialized, the debugger's component matching software causes a unique identifier of the microcontroller or other IC device to be read, identifying it to the ICE and the rest of the debugging system.

Moreover, a software tool contains different plug-in modules, each applicable for a different version of the devices that may be recognized. Upon determining the device's version identifier, the software automatically loads the corresponding plug-in into the ICE base unit. In one embodiment, the plug-in is loaded into a field programmable gate array (FPGA) in the ICE. In another embodiment, the plug-in may be loaded into a microcontroller, a complex programmable logic device (CPLD), or another programmable functionality within the ICE. Further, in response to determining the version number, the proper plug-in module is automatically activated on the software tool in the host computer. Automatically, the software tool and the ICE base unit become compatible with whatever device version is deployed upon the pod. In as much as the types of information that might change with each different device may include the way in which decoding of supervisory operational codes are performed, the reset sequence of the device, and the way in which the device is programmed, etc., these functions become automatically customized for any particular device deployed upon the pod by the automatic loading of the proper corresponding plug-ins. No unique hardware is needed for any particular device to be programmed and tested. Great flexibility is thus achieved. Further, this is achieved with minimal user intervention requirement, and in a fashion that is transparent to users of the system.

More specifically, where a host computer deploys a debugger program and is coupled to an in-circuit emulator (ICE), in turn coupled to a microcontroller or other IC device, an embodiment of the present invention effectuates a debugging system. The present embodiment allows communications between the device and the rest of the debugging system by programming the ICE with a first logic set. The first logic set enables the ICE to establish communications with the device and determine a unique identifier of the device. The ICE communicates the device's unique identifier back to the host computer. The host computer matches the unique identifier to a second logic set and a plug-in module, in one embodiment by referencing a database of corresponding device identifiers and programs and plug-in modules. The host computer then programs the ICE with the second logic set and activates the plug-in module. The second logic set allows the ICE and the device to execute program instructions downloaded with the second logic set in lock-step fashion to perform the debugging functions. The plug-in module allows the host computer to interact in the debugging process as necessary. This achieves flexibility, because any ICE may be programmed to communicate with any device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
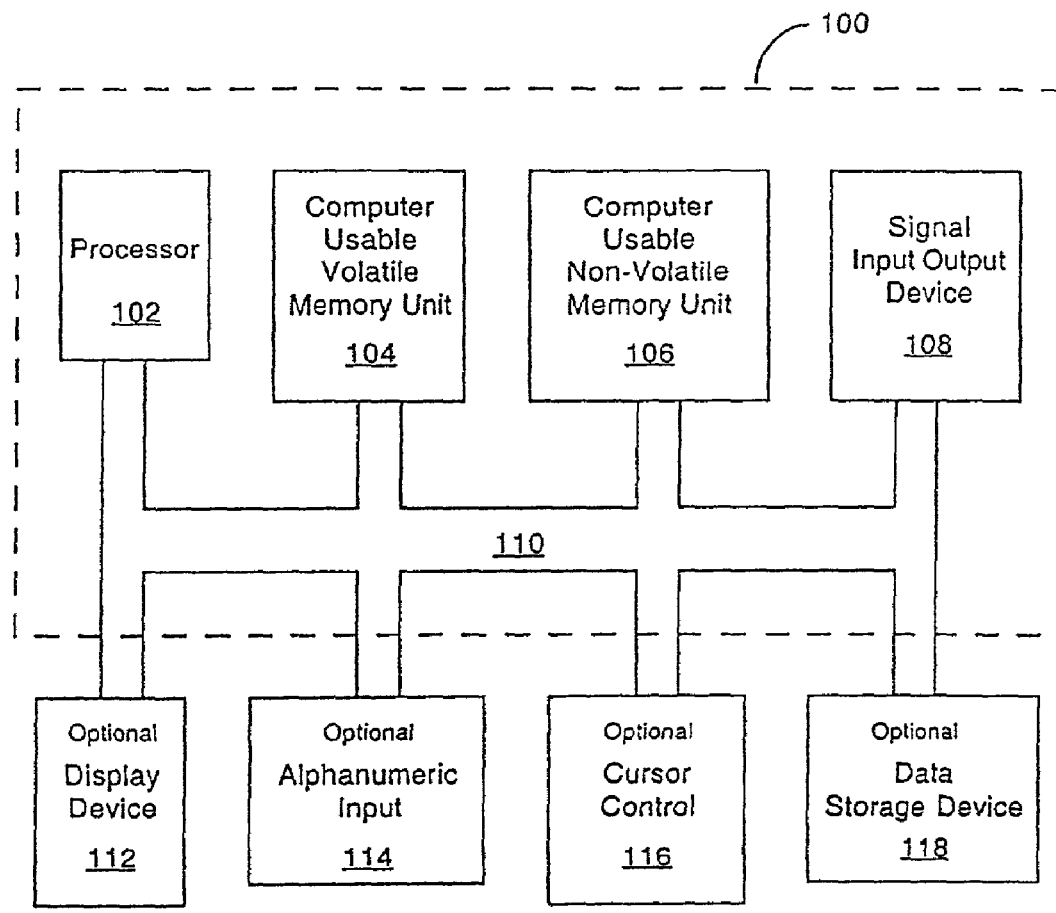
FIG. 1 illustrates a general purpose computer system, upon which embodiments of the present invention may be implemented.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "programming," "determining," "matching," "activating," "emulating," "reading," "communicating," "mapping," "processing," "performing," or the like, refer to the action and processes of a computer system (e.g., system 100; FIG. 1), or similar electronic computing device, that manipulates and transforms data represented as physical, e.g., electronic quantities within the communications and computer systems' registers and memories into other data similarly represented as physical quantities within the computer system memories or registers or other such information storage, transmission, or display devices.

Further, embodiments of the present invention may be discussed in terms of computer processes. For example, FIG. 5 refers to process 500, performed in accordance with embodiments of the present invention for debugging which, in one embodiment, are carried out by processors and electricavelectronic components under the control of computer readable and computer executable instructions.

The computer readable and computer executable instructions reside, for example, in data storage features such as data storage device 118 (FIG. 1) and computer usable volatile memory 104 (FIG. 1) and/or computer usable non-volatile memory 106 (FIG. 1). However, the computer readable and computer executable instructions may reside in any type of computer readable medium. Process 500 may be performed by, e.g., executed upon software, firmware, and/or hardware or any combination of software, firmware, hardware, and/or by other effective mechanism or instrumentality, e.g., by other suitable means.

Exemplary Computer System Platform

FIG. 1 is a block diagram of one embodiment of an exemplary computer system 100 that can be used, for example, as a platform for embodiments of the present invention. System 100 is well suited to be any type of computing device (e.g., browser client computer, server computer, portable computing device, etc.).

Computer system 100 of FIG. 1 comprises an address/data bus 110 for communicating information, one or more central processors 102 coupled with bus 110 for processing information and instructions. Central processor unit 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices (I/O circuit) 108 coupled with bus 110 for enabling system 100 to interface with other electronic devices. Optionally, computer system 100 can include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102.

The system 100 also includes a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics. It will be appreciated by one of ordinary skill in the art that computer 100 can be part of a larger system.

Exemplary Architecture

Figure 2:
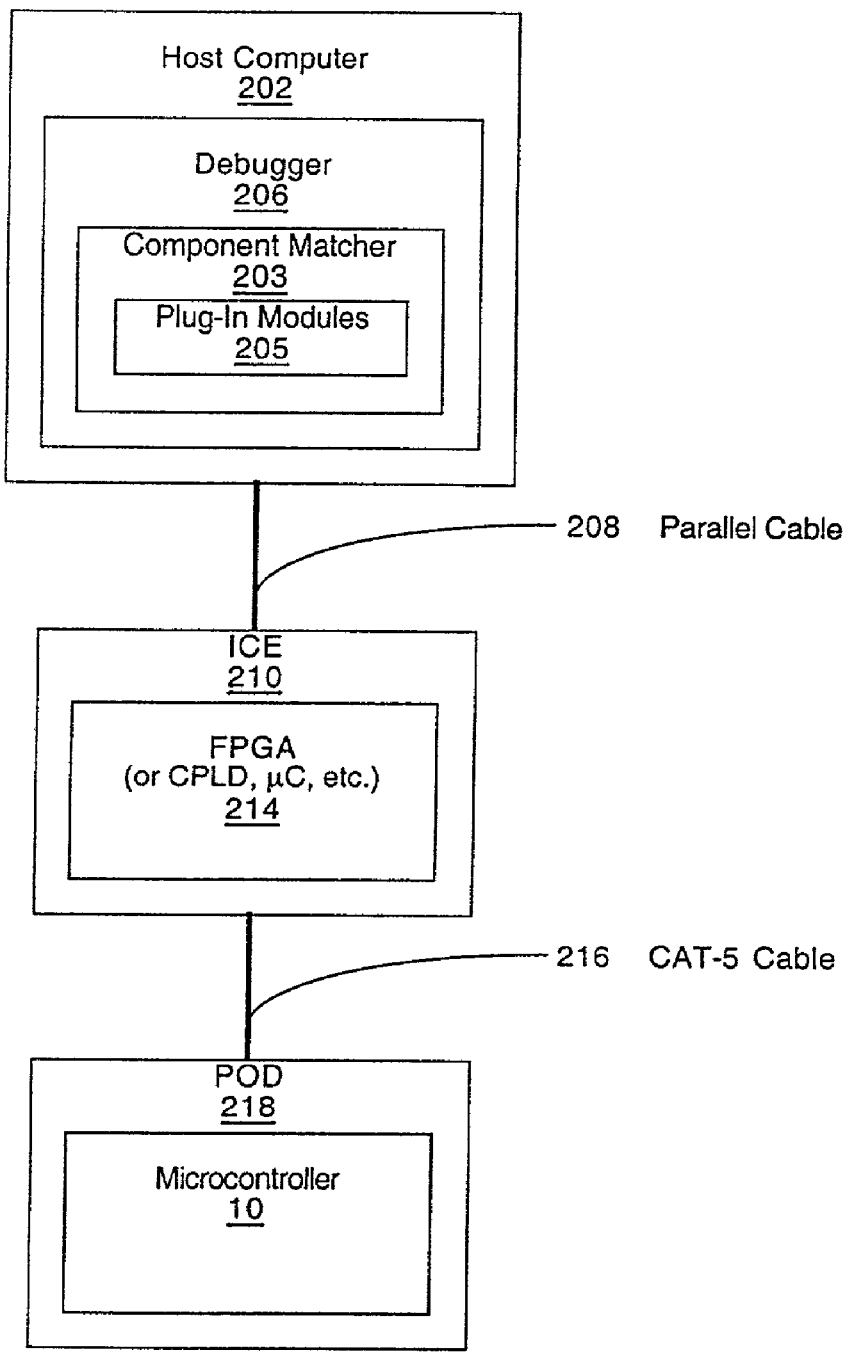
FIG. 2 is a block diagram of a system for implementing a debugger universal developer, in accordance with one embodiment of the present invention.

With reference now to FIG. 2, a debugging system 200 effectuates a universal developer, according to an embodiment of the present invention. In the present embodiment, a component matching suite 203 is deployed upon a host computer 202. Host computer 202 is any type of computer system capable of functioning as a platform for the software constituting debugger 206. For example, host computer may be a PC, with a high capacity RAM and disc storage, and powerful processors, deploying a Windows™ application, upon which debugger 206 may function. A component matcher functionality 203 within debugger 206 deploys an array of plug-in modules 205.

In one embodiment, a parallel cable 208 couples host computer 202 to an in circuit emulator (ICE) 210. ICE 210 in one embodiment contains a field programmable gate array (FPGA) 214, which may be programmed in response to code promulgated by the debugger 204. In another embodiment, the plug-in may be loaded into a microcontroller, a complex programmable logic device (CPLD), or another programmable functionality within the ICE. The circuit under test in the present embodiment is a microcontroller or other IC 10 inserted into a pod 218. Pod 218, in the present embodiment, is connected to ICE 210 by a cable 216, capable of transferring data at a rate of 100 Mbps or greater. In the present embodiment, ICE 210 has a data storage capacity of 128 Kbytes in one embodiment and is of limited computational power, relative to the host computer 202. In another embodiment, these specific characteristics may change.

Pod 218 mounts a device for testing and other purposes. The device mounted on pod 218 may be a microcontroller 10 or another IC. The microcontroller 10 supportable by pod 218 may be of a single, unique design. Alternatively, microcontroller 10 may exemplify more than a single device, and pod 218 may be capable of supporting various device pin-outs. In the alternative embodiment, the devices exemplified by microcontroller 10 may be similar, in particular, how they connect and communicate through pod 218 with the rest of system 200.

Each device exemplified herein by microcontroller 10 is identified by a unique identifier. The unique identifier is effectively programmed in upon manufacturing the device, and is not generally modifiable by a user. The unique identifier may be indexed to a database of information about the device. Such information may include connectivity information such as a number of pins and the connective function of those pins. Information may also be available regarding memory. For example, identified by its unique identifier, it may be determined that microcontroller 10 has, for example, 80 pins, a RAM capacity of 256 bytes and 16 Kbytes of program space. Information regarding the function and behavior of the device may also be available by the unique identifier of the device, for example, that the device has a certain feature set, and/or a certain kind of bug is known to exist or persist in its behavior.

Pod 218 and the device it mounts has the capability to communicate with ICE 210 and exchange information therewith. ICE 210 according to embodiments of the present invention has the capability to recognize pod 218 and any device deployed thereon, exemplified herein by microcontroller 10. This recognition may be effectuated by the unique identifier of microcontroller 10. Upon interconnecting ICE 210 and pod 218 deploying microcontroller 10, ICE 210 automatically reads the unique identifier of pod 218 and/or of microcontroller 218 and relays that information back to the debugger 206 and/or component matcher 203. Component matcher 203 analyzes the information relayed to it by ICE 210 and responds by recognizing pod 218 and/or microcontroller 10, also.

Component matcher 204 also responds by instructing ICE 210 to behave in a certain way to properly interface with microcontroller 10 via pod 218, and/or to proceed with its testing thereof. Thus, debugger 206, component matcher 204, and ICE 210 react accordingly to whatever combination of pod and pod-deployed device (exemplified herein by pod 218 and microcontroller 10, respectively) are coupled to them. In one embodiment, debugger 206 software and component matcher 203, and ICE 210 share the same method for reading device and pod identifiers made available through pod 218. Alternatively, debugger 206 software and component matcher 203, and ICE 210 may not share the identical method for reading device and pod identifiers made available through pod 218, however, they all share the ability to determine the identity of pods and devices mounted thereon in one way or another. Advantageously, this ability confers further flexibility upon system 200.

The exemplary architecture of system 200 constitutes three different components, operating with different computational characteristics, including but are not limited to processing power and memory, and even internal structure and function. System 200 effectuates debugging operations in a low cost, flexible, distributed architecture. It is appreciated that in another embodiment, system 200 may be constituted by components different from those described herein, which are exemplary and one effective functional architecture, but in no way meant to express or imply exclusive applicability. Furthermore, system 200 is effectively adaptable to the limited supervisory capabilities of relatively lower level IC computing devices (e.g., chip), exemplified by microcontroller 10. Advantageously, this adaptability allows changing supervisory capabilities handled by the chip, without necessitating modification of much if any of the higher level capabilities of debugger 206.

In the present embodiment, neither ICE 210 nor its FPGA 214 is limited to functioning with a single type of pod or device thereon. On the contrary, ICE 210 is fully capable of supporting any type of pod exemplified herein by pod 218 and/or any type of device mounted on pod 218, as exemplified herein by microcontroller 10. ICE 210 thus accords great flexibility to system 200. This flexibility is especially advantageous vis-à-vis conventional debugging systems, wherein each different pod and/or device mounted thereon requires a unique ICE. The flexibility accorded by one present embodiment may accrue to functionalities within debugger 206. ICE 210 and pod 218 execute program instructions in lock-step fashion. Host computer 202 accesses ICE 210 to determine the internal state of device 10 reflected therein, during debugging operations.

Figure 3:
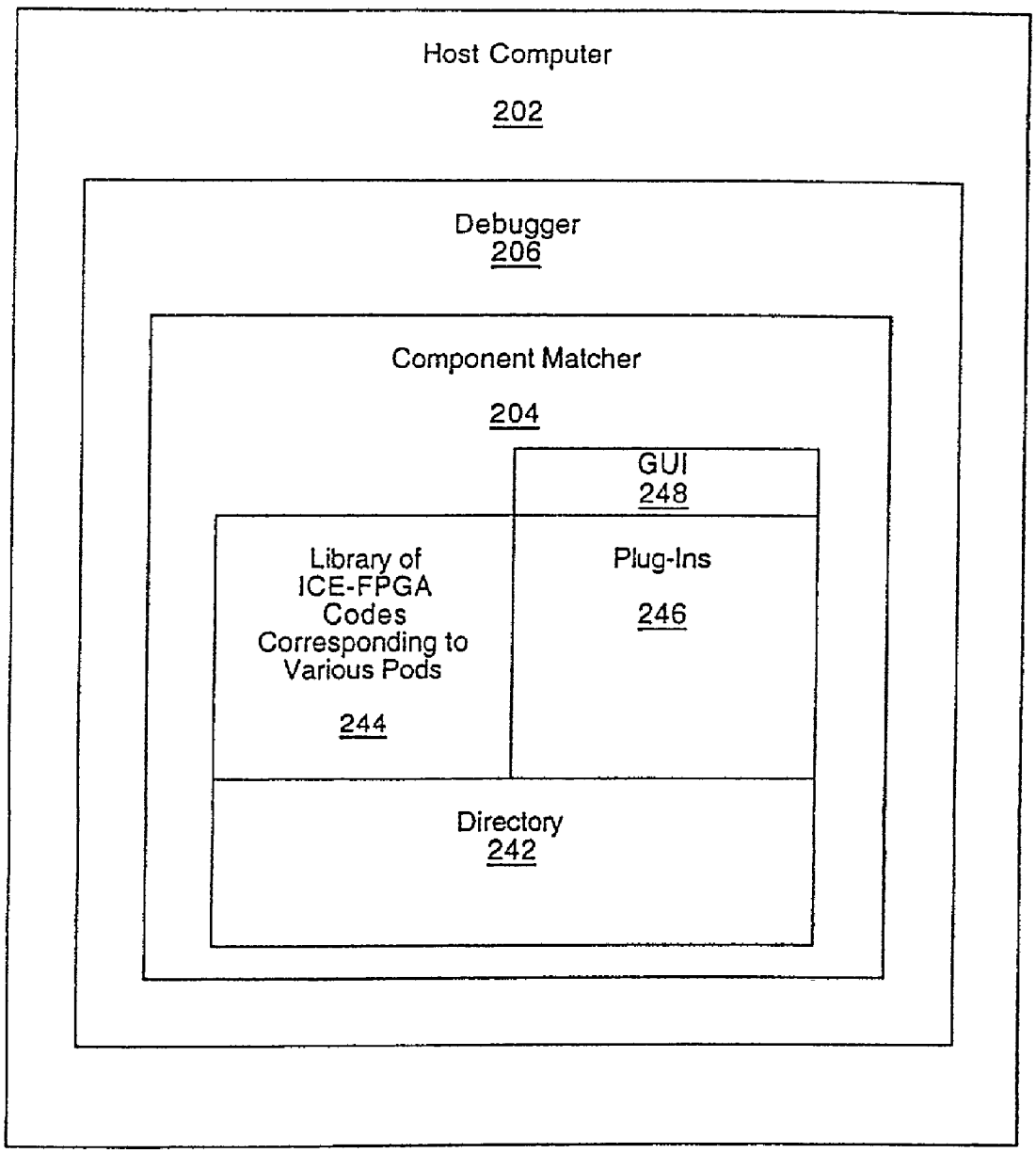
FIG. 3 is a diagram of a component matcher of a system for implementing a debugger universal developer, in accordance with one embodiment of the present invention.

With reference to FIG. 3, host computer 202 serves as a platform for debugger software 206. In one embodiment of the present invention, component matcher 204 is a part of debugger software 206. In another embodiment, component matcher 204 may be separate from, yet co-functional and interactive with debugger software 206.

Component matcher 204 has a directory 242. Once microcontroller 10 is uniquely identified, its identifier can then be stored in directory. Upon identifying microcontroller 10 as a particular type of device, component matcher 204 consults a library of codes by which, in the present embodiment, FPGA 214 of ICE 210 (FIG. 2) may be programmed accordingly to effectively and properly interact with that particular device. In another embodiment, a flash- or EEPROM-based microcontroller, a CPLD, or another programmable functionality within ICE 210 may be so programmed.

Component matcher 204 will also select a plug-in from an array 246 of plug-ins based on the version identification code. The plug-in selected corresponds to the proper plug-in to allow interaction of the debugger 206 software with the particular device identified. Such interaction between the debugger 206 and microcontroller 10 may be further facilitated by selecting a graphical user interface (GUI) from an array 248 of GUIs available. The proper GUI 248 is the one that will facilitate the best interface between a user of debugger 206 with microcontroller 10.

Figure 4:
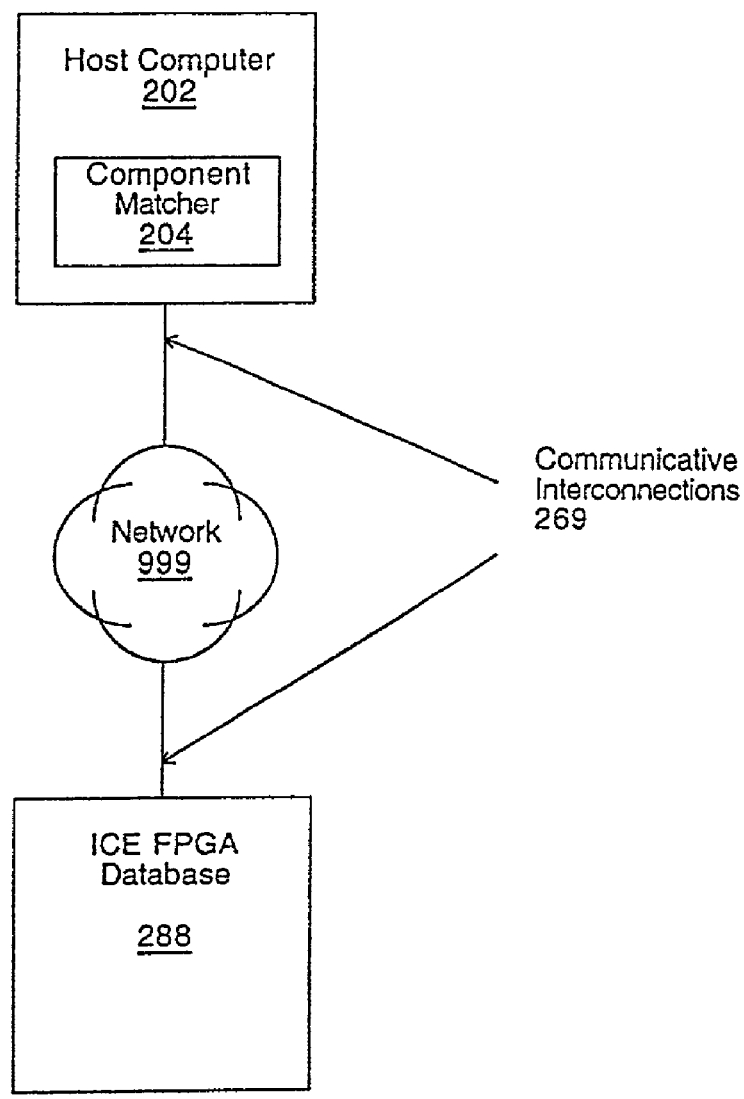
FIG. 4 is a diagram of a component matcher connected via a network to a database, in accordance with one embodiment of the present invention.

With reference to FIG. 4, one embodiment allows component matcher 204 to access a database 288 of codes by which FPGA 214 of ICE 210 (FIG. 2) may be programmed accordingly to effectively and properly interact with that particular device. In the present embodiment, database 288 may be remote from computer 202. Access of component matcher 202 with database 288 is achieved through communicative coupling facilitated by communicative interconnections 269, and via network 999, which may be the Internet. The present embodiment has the advantage of allowing updates to library 244 (FIG. 3) and/or downloading of ICE FPGA codes that are not in library 244. Alternatively, it may dispense with the requirement of deploying a library within component matcher 204, debugger 206, or host computer 202 at all.

With reference again to FIG. 2, a user connects pod 218, mounting microcontroller 10, via ICE 210 to host computer 202 to begin a debugging session. Microcontroller 10 and pod 218 have a certain set of specific features. Given that particular pod 218, the FPGA 214 in ICE 210 will receive a program that exactly mirrors the capabilities of the pod 218, such that it can emulate its behavior. Further, the FPGA 214 will be programmed with debugging features such that ICE 210 also matches microcontroller 10. This information downloaded to the FPGA 214 is based on the identification code of the microcontroller 10.

FPGA 214 is re-programmed every time the debugging software 206 is run with ICE 218, to program the ICE 210 to do something, e.g., debugger 206 downloads into FPGA 214 a bitstream. This download is based on the microcontroller's version identification. This bitstream carries a logic set containing everything FPGA 214 needs to configure its logic to perform useful functions with pod 218 and microcontroller 10. For an exemplary microcontroller 10, one function may be a certain type of RAM paging wherein four RAM pages are made sequentially. In another embodiment, ICE 210 may be re-programmed somewhat differently. For example, in one alternative embodiment, a flash-based microcontroller suffices to validate the existing program. In the alternative embodiment, reprogramming occurs only as needed.

The programming downloaded to FPGA 214 in ICE 210 in the present embodiment accomplishes at least two major functions. First, whatever function the microcontroller or other IC connected to pod 218 performs will be mirrored by the bitstream downloaded by debugger 206 to FPGA 214 in ICE 210. In this fashion, microcontroller 10 and ICE 210 operate in lock-step during debugging operations. Second, debug features are loaded into ICE 210 that support the features of microcontroller 10. In the present example, the debug features support the four RAM sequential pages above. They may effectuate, for instance, a break upon an exemplary stack going into the third page to allow an opportunity to examine the internal state of the microcontroller 10 at that particular point. Some of these debug features may be specific to particular microcontrollers or other IC's, which microcontroller 10 exemplifies herein.

Thus, to support the particular features of specific microcontrollers or other IC's, which microcontroller 10 exemplifies herein at the software level in debugger 206, user code is supportable and whatever functionality ICE 210 possesses should be matched. For instance, if ICE 210 is to have some particular debugging feature for a particular microcontroller 10, then the software of debugger 206 needs to support it, as by providing a sufficient GUI (e.g., GUI 248; FIG. 3). The host computer 202 downloads the required data to allow the ICE 210 to properly co-operate with device 10. Plug-in modules 205 match the needs of particular devices 10 and the host computer 202. It is appreciated that software plug-in modules 205 may be distributed in more than one section of debugger 206. However, they may also be viewed functionally as a single array.

Thus, three components, the pod 218, the ICE 210, and the component matcher 203 of debugger 206 are matched automatically when the host application connects to pod 218 and determines the type of pod that is attached at that instant. Upon initially connecting to the ICE 210, debugger 206 begins downloading an initial program, e.g., the bit stream logic set, for some particular device attached to the pod 218, exemplified herein by microcontroller 10. This initial program need only have sufficient capability to communicate with pods, exemplified by pod 218 herein. For example, initially, ICE 210 need only determine whether or not a pod 218 is connected, and establish communications with it if it is. In an alternative embodiment, simply determining that a pod 218 is connected will initiate communicative attempts, whether or not the ICE 210 actually has the capability to communicate with the particular pod connected or not. In this way, different communicative techniques will be attempted until communications are established between pod 218 and ICE 210. In either embodiment, additional data transfer may then begin between all three components of system 200.

Figure 5:
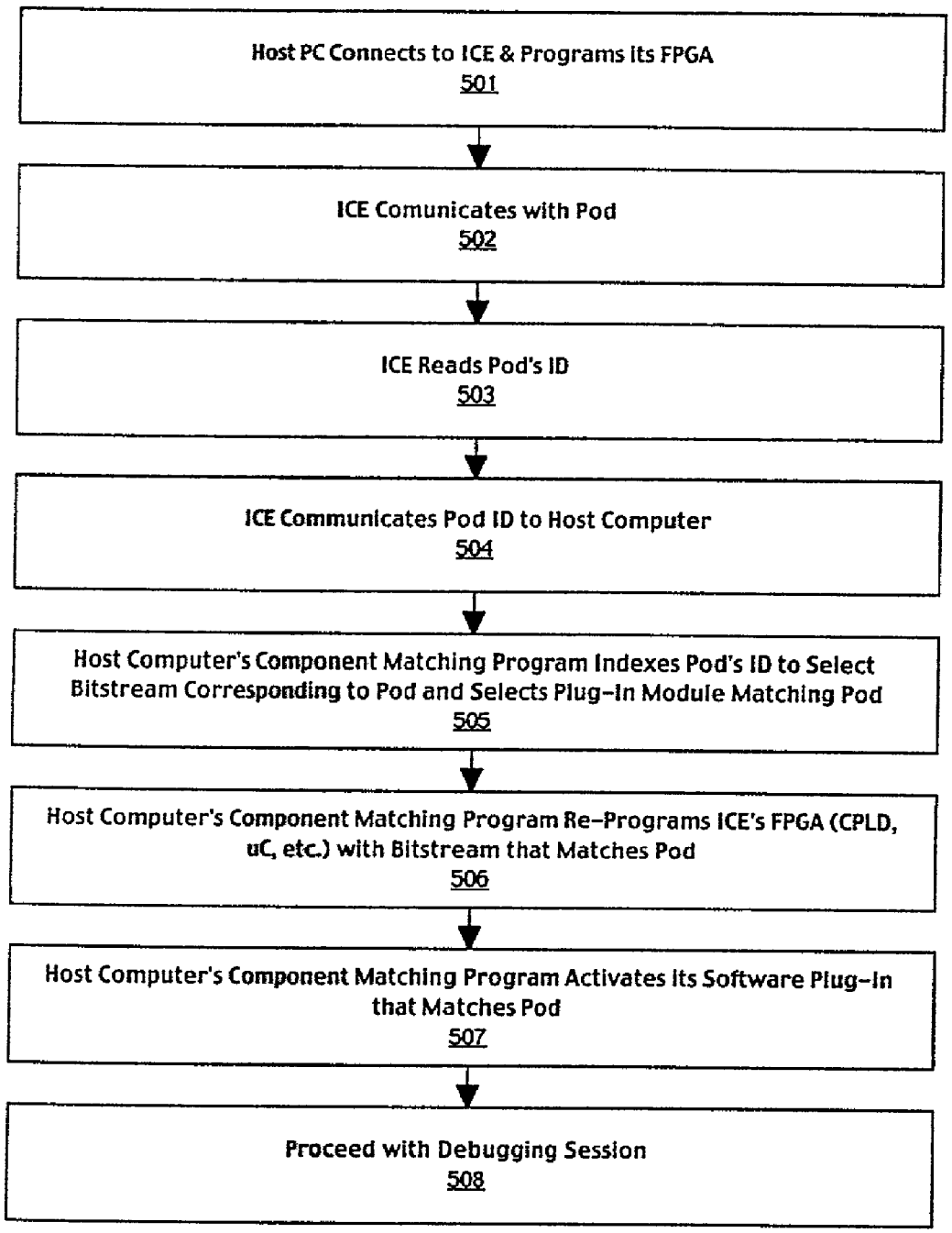
FIG. 5 is a flow chart of a method for component matching by a debugger universal developer, in accordance with an embodiment of the present invention.

With reference to FIG. 5, a flowchart describes a process 500 of communicating and transferring data between the three components of a debugging system (e.g., debugging system 200; FIG. 2), according to one embodiment of the present invention. Process 500 begins with step 501, wherein a host computer (e.g., host computer 202; FIG. 2) connects to an ICE and initially programs the FPGA therein (e.g., ICE 210, FPGA 214; FIG. 2).

In step 502, the ICE ascertains that a pod (e.g., pod 218; FIG. 2) is connected, and establishes communications with it. In step 503, the ICE reads the pod's unique identifier information. In step 504, the ICE communicates the pod's unique identifier to the host computer.

In step 505, the host computer's component matching program (e.g., component matcher 203; FIG. 2) indexes the pod's unique identifier to a library of ICE FPGA codes corresponding to various pods (e.g., library 244; FIG. 3). Further, the component matching program selects a plug-in module (e.g., plug-in module 205; FIG. 2) from an array of available plug-in modules (e.g., plug-in module array 246; FIG. 3). The plug-in module selected exactly matches the pod connected.

In step 506, the host computer's component matching program re-programs the ICE's FPGA with a logic set (e.g., a bitstream) that matches the pod.

In step 507, the host computer component matching program activates its software plug-in that matches the microcontroller or other IC deployed upon the pod.

Then, in step 508, the debugging session may proceed with the debugging session, ending process 500.

As part of the initial ICE to host computer connection, the ICE FPGA is re-programmed (step 501) with a basic program giving the ICE just enough functionality to establish ICE-pod communications and read the pod's unique identifier. In the present embodiment, all pods respond to the same "Read" sequence, such that they can be read in the same way. Thus, a single generic FPGA bitstream suffices to interrogate any pods and determine their unique identifiers. From that point forward, the ICE and the pod may not match further. In fact, they may be incompatible, in so far as the ICE is presently programmed. However, the core function of establishing communication and reading the unique identifier is invariant.

As long as that core function remains the same for all pods and ICE's as their FPGA's are programmed, the ICE can read the pod's unique identifier and transmit it back to the host computer for further component matching functions. These may be effectuated by the host computer blanket-reprogramming the ICE's FPGA to make that ICE compatible with the pod and its microcontroller.

An alternative embodiment supports situations wherein a pod may no longer be compatible with the initial 'Read' protocol. One conceivable such situation is the introduction of a new pod product of another kind, perhaps from a different manufacturer. In the alternative embodiment, upon attempting to open ICE-pod communications (step 402) and determining that the pod was incapable of being interrogated, the ICE informs the host computer. In this case, the host computer looks for other bitstreams to attempt, for instance, accessing a database and/or library, and downloads a bitstream its programs ascertains may be more compatible with the pod. Advantageously, this increases flexibility and applicability.

In summary, where a host computer deploys, for example, a debugger program and is coupled to an in-circuit emulator (ICE), in turn coupled to a microcontroller or other IC device, an embodiment of the present invention effectuates a debugging system. The present embodiment allows communications between the device and the rest of the debugging system by programming the ICE with a first logic set. The first logic set enables the ICE to establish communications with the device and determining a unique identifier thereof. The ICE communicates the device's unique identifier back to the host computer. The host computer matches the unique identifier to a second logic set and a plug-in module, in one embodiment by referencing a database of corresponding device identifiers and programs and plug-in modules. The host computer then programs the ICE with the second logic set and activates the plug-in module. The second logic set allow the ICE and the device to execute program instructions downloaded with the second logic set in lock-step fashion. The plug-in module allows the host computer to interact in the debugging process as necessary. Any ICE may be programmed to communicate with any device; no unique additional hardware is needed for any particular device to be programmed and tested. Great flexibility is thus achieved. Further, this is achieved without any user intervention requirement, and in a fashion that is transparent to users of the system.

Thus a method and system for automatically matching components in debug is described. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the Claims appended hereto and their equivalents.

What is claimed is:

1. In a debugging system comprising a host computer deploying a debugger program and an in-circuit emulator coupled to said host computer wherein said in-circuit emulator is coupled to a device, a method for debugging comprising:
    programming said in-circuit emulator with a first logic set that enables communication between said in-circuit emulator and said device;
    determining an identifier of said device using said in-circuit emulator, wherein said device comprises one of a plurality of devices and wherein said device is coupled to said in-circuit emulator pod, wherein said pod is compatible with all devices of said plurality of devices;
    matching said identifier to a second logic set and a software module;
    programming said in-circuit emulator with said second logic set;
    activating said software module within said host computer; and performing debugging functions.

2. The method as recited in claim 1 wherein said module comprises a plug-in module.

3. The method as recited in claim 1 wherein said first logic set effectuates communicative coupling between said in-circuit emulator and said device, and wherein said first logic set enables said determining an identifier of said device.

4. The method as recited in claim 1 wherein said identifier comprises a code programmed into said device.

5. The method as recited in claim 4 wherein said determining an identifier of said device further comprises:
    reading said code; and
    communicating said code to said host computer.

6. The method as recited in claim 1 wherein said matching said identifier to a second logic set and a software module further comprise accessing a database.

7. The method as recited in claim 6 wherein said second logic set programs said in-circuit emulator such that it properly emulates said device.

8. In a system comprising a host computer deploying a debugger program and an in-circuit emulator coupled to said host computer, wherein said in-circuit emulator is coupled to a device, a method for debugging comprising:
  determining an identifier programmed into said device by programming said in-circuit emulator with a first logic set, wherein said device comprises one of a plurality of devices and wherein said device is coupled to said in-circuit emulator via a pod, wherein said pod is compatible with all devices of said plurality of devices;
  automatically matching said identifier to a second logic set and a software module;
  programming said in-circuit emulator with said second logic set to emulate said device;
  activating said software module within said host computer system; and
  debugging said device.

9. The method as recited in claim 8 wherein said software module comprises a plug-in module.

10. The method as recited in claim 8 wherein said second logic set programs said in-circuit emulator to operate in lock-step execution with said device.

11. The method as recited in claim 8 wherein said identifier comprises a unique code associated with a version of said device.

12. The method as recited in claim 11 wherein said determining an identifier programmed into said device further comprises:
  reading said code; and
  communicating said code to said host computer.

13. The method as recited in claim 8 wherein said matching said identifier to a second logic set and a software module further comprises accessing a database.

14. The method as recited in claim 8 wherein said in-circuit emulator is compatible with a plurality of different device versions based on a plurality of different logic sets available.

15. A component matching system comprising:
  a host computer system for executing a debugging program;
  an in-circuit emulator coupled to said host computer system; and
  a device coupled to said in-circuit emulator and for executing code in lock-step with said in-circuit emulator, wherein said debugging program and said in-circuit emulator are automatically modified, based on a version code stored in said device, so that both said debugging program and said in-circuit emulator are compatible with said device, wherein said device comprises one of a plurality of devices and wherein said device is coupled to said in-circuit emulator via a pod, wherein said pod is compatible with all devices of said plurality of devices.

16. The component matching system as recited in claim 15 wherein said host computer system selects a particular plug-in module from a plurality of plug-in modules based on said version code to modify said debugging program.

17. The component matching system as recited in claim 16 wherein said host computer system downloads a particular logic set into said in-circuit emulator based on said version code.

18. In a system comprising a host computer coupled to an in-circuit emulator coupled to a device under test, a debugging method comprising:
  a) reading a version code stored in said device under test, wherein said device comprises one of a plurality of devices and wherein said device is coupled to said in-circuit emulator via a pod, wherein said pod is compatible with all devices of said plurality of devices;
  b) determining a plug-in module compatible with said version code;
  c) determining a logic set compatible with said version code;
  d) programming said host computer with said plug-in module;
  e) programming said in-circuit emulator with said logic set; and
  f) performing debugging functions with said host computer, said in-circuit emulator, and said device, wherein said in-circuit emulator and said device operate in lock-step fashion.

19. The debugging method as recited in claim 18 wherein said step a) further comprises communicating said version code to said host computer.

20. The debugging method as recited in claim 18 wherein said steps b) and c) further comprise accessing a database.

21. The debugging method as recited in claim 18 wherein said step e) further comprises downloading said particular logic set into said in-circuit emulator based on said version code.

22. The debugging method as recited in claim 21 wherein said logic set is downloaded into a component of said in-circuit emulator selected from the group consisting essentially of a field programmable gate array, a complex programmable logic device, and a microcontroller.

* * * * *